United States Patent [19]

Eberhardt

[11] 4,323,324
[45] Apr. 6, 1982

[54] CHUCK BRAKE

[75] Inventor: Timothy J. Eberhardt, San Francisco, Calif.

[73] Assignees: Alfred F. Eberhardt; Marvin Coghill, both of Bangkok, Thailand; part interest to each

[21] Appl. No.: 31,050

[22] Filed: Apr. 18, 1979

[51] Int. Cl.$^3$ .................. B23B 31/06; B23B 31/26
[52] U.S. Cl. ................................ 408/124; 81/90 A; 188/75; 279/1 K; 279/62
[58] Field of Search ............ 408/240, 124; 81/90 A; 279/1 K, 48, 49, 56, 57, 58, 59, 60, 61, 62, 63, 64, 65, 69; 188/75

[56] References Cited

U.S. PATENT DOCUMENTS 2,716,555  8/1955  Rowe ................................. 279/56
4,085,337  4/1978  Moeller .......................... 408/124 X Primary Examiner—Z. R. Bilinsky
Attorney, Agent, or Firm—Kalish & Gilster

[57] ABSTRACT

A chuck brake is secured to a hand-held reversibly rotatable drill of the variable speed type having a chuck. The chuck brake permits selective tightening or loosening of the chuck by operation of the drill. Brake shoes surround and are adapted to engage at least a portion of the peripheral surface of a housing of the chuck, being secured to the front of a drill on opposite sides of the chuck. The brake shoes are manually engageable by pinching action of the user for movement between a first position permitting free rotation of the chuck housing and a second position providing friction between the brake shoes and a first area of the chuck housing. In the second position, rotation of the chuck housing in one direction is impeded, as for tightening. The brake shoes are shiftable also toward the drill to a third position in which increased friction with the chuck housing is provided to impede rotation of the chuck housing in an opposite direction, as for loosening of the chuck. Movement of the brake shoes to the third position also is preferably operative of an electrical switch within the drill for enabling operation within the reversed rotation without further effort by user.

12 Claims, 6 Drawing Figures

CHUCK BRAKE

BACKGROUND AND SUMMARY OF THE INVENTION

The present invention relates to a chuck brake for use with a reversible drill, particularly of the hand-held, reversible, variable speed electric type.

As is well known, portable electric drills are quite often provided with a drill chuck or so-called chuck having a housing which is relatively rotatable with respect to a chucking element for tightening and loosening. For accomplishing such relative rotation, the chuck housing is typically provided with gear teeth around a peripheral forward portion thereof. The drill chuck typically has apertures into one of which a chuck key may be inserted for rotation, the chuck key having gear teeth which mesh with those of the chuck housing for imparting the relative rotation of the housing and chucking element.

Chucks of tools of this character are often used for holding a variety of different devices, including the shanks of drill bits, as well as accessories such as grinding wheels, sanding disks and so forth.

It is a great waste of time and an inconvenience as well for the user to have to resort to above-described operation of the chuck key for tightening or loosening the drill chuck, particularly where one desires to quickly and promptly change drill bits or other accessories which are to be chucked by the drill chuck.

One could simply provide some sort of device for locking the chuck housing to prevent its movement whereupon, when the tool is energized, the drill chuck would be caused to rotate relative to the drill chuck housing which would remain immobile. This would indeed cause tightening of the drill chuck about the shank of the drill bit or other accessory when the drill is operated in the forward direction. However, as tightening occurs, the electric motor of the tool becomes locked. This can result in overheating and even melting of the windings of the motor commutator. To prevent such possibility, it is desired that the motor be allowed to turn when full power is developed.

It might be supposed that one could simply use one's hand to apply friction to the chuck housing for tightening or untightening the chuck by operating the drill. However, under no circumstances should this be attempted, as it produces friction burns and can result in wrenching or even breaking one's wrist. In any event, the attempted use of the hand applies insufficient friction for satisfactory tightening or loosening of the chuck.

Accordingly, it is an object of the invention to provide a brake for the chuck of a reversible drill tool.

A further object of the invention is the provision of such a chuck brake which is manually operable for selectively frictionally impeding rotation of a chuck housing of such a chuck to permit selective tightening of a drill chuck of the chuck about the shank of a drill bit or other shanked device.

Another object of the invention is the provision of such a chuck brake which is selectively manually operable for frictionally impeding rotation of the chuck housing in an opposite direction for loosening of the drill chuck from about the shank of a drill bit or other shanked device.

A still further object of the invention is the provision of such a chuck brake which is selectively manually operable to provide increased friction for use in frictionally impeding rotation of the chuck housing in the opposite direction more greatly than in the forward direction, thereby to facilitate and assure loosening of the drill chuck.

Yet another object of the invention is the provision of such a chuck brake selectively manually operable to cause operation of the drill with reverse rotation to be automatically enabled without further effort by the user.

A further object of the invention is the provision of such a chuck brake which is selectively manually operable for frictionally impeding the rotation of the chuck housing without locking the chuck housing from rotation, thereby to prevent a motor of such a drill from being stalled when fully energized, hence preventing damage to the motor.

A still further object of the invention is the provision of such a chuck brake which allows sufficient friction to be entirely safely applied to the chuck housing for fully satisfactory tightening or loosening of the chuck.

Among other objects of the invention may be noted the provision of such a chuck brake which is not only of a relatively simple and easily assembled construction but which also is low in cost, reliable in operation, and of a most durable character.

Additional objects will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
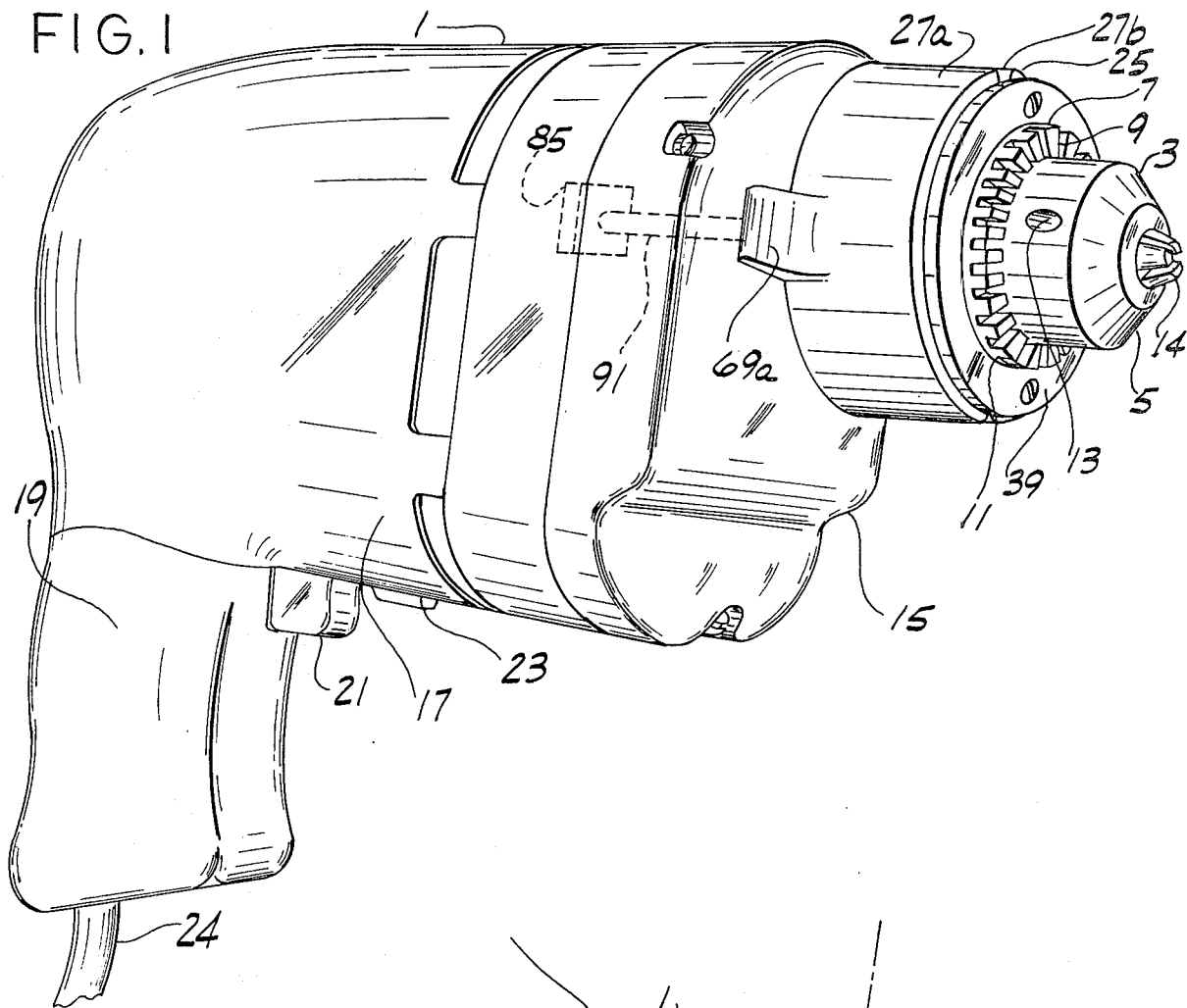
FIG. 1 is a perspective view of a portable, hand-held reversible electric drill tool equipped with a chuck brake constructed in accordance with and embodying the present invention.

Referring now to the drawings designated generally at reference numeral 1 is an electric variable-speed reversible drill type tool of the ubiquitous hand-held variety, the same including a chuck 3 having a chucking member 5 around which extends a cylindrical chuck housing 7 having teeth 9 in a beveled shoulder 11 thereof. The teeth 9 are adapted to be engaged by corresponding teeth of a chuck key (not shown) inserted in one of a number of apertures 13 in the nose of the chuck. As is well known, the sleeve is relatively rotatable upon turning of the chuck key to cause jaws 14 of the drill chuck to clampingly engage the shank of a drill bit or other accessory, such as a sanding disk or polishing spindle.

At the front of drill tool 1 (which for purposes of convenience may simply be referred to hereinafter as a drill) is a housing 15 containing speed reduction gears for reducing the shaft output speed of an electric motor (not shown) contained within a rear housing 17 and for turning drill chuck 3 at a speed lower than that of the motor. Conventionally also, a pistol grip type of handle 19 is provided, there being a trigger control 21 for varying the degree of energization of the motor for controlling its speed and, therefore, the angular velocity of the chuck. Conventionally also, a suitable switch or other control 23 is provided for permitting the direction of rotation to be selected by the user. Such control 23 is by way of example only and numerous configurations exist in commercial drills for providing reversing functions. AC power is provided by the usual power cord 24 which extends downwardly from pistol grip handle 19.

By modification or production in accordance with the teachings of this disclosure, drill 1 is provided with a chuck brake 25 of the invention which will be seen to surround the housing 7 of the chuck and which is secured to gear housing 15.

Figure 2:
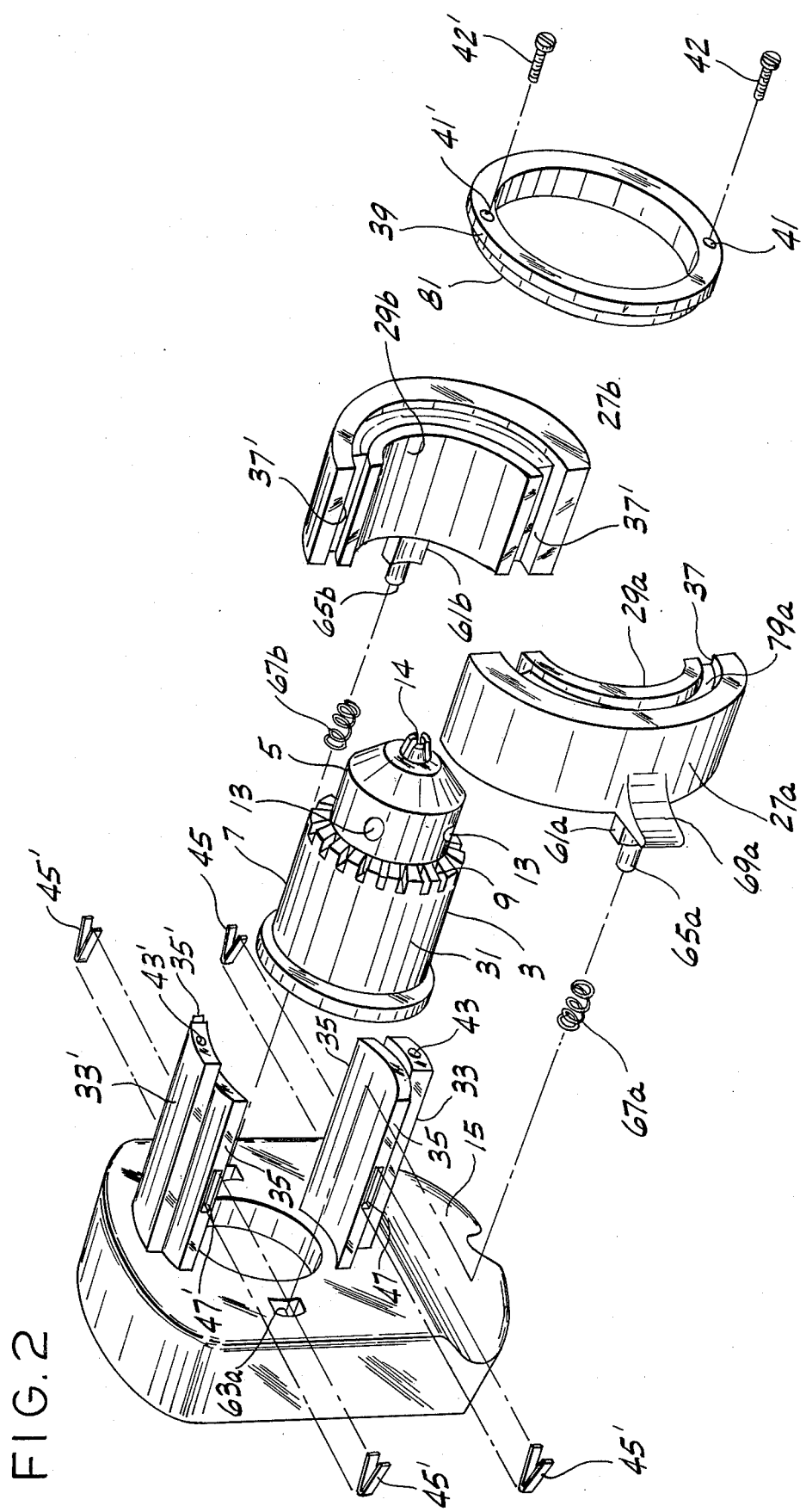
FIG. 2 is an exploded view, in perspective, of modified portions of the drill tool and the chuck brake.

Referring to FIG. 2, the chuck brake of the invention is seen to comprise a pair of brake shoes 27a,27b on opposite sides of the chuck housing and having respective inner surfaces 29a,29b. These surfaces are of semi-cylindrical configuration corresponding to the outer peripheral surface 31 of chuck housing 7 for frictional engagement therewith upon pinching action of the brake shoes by the user. The brake shoes are carried by a pair of support posts including a lower member 33 and upper member 33' having flanges as illustrated representatively at 35,35' which fit within corresponding grooves 37,37' at the upper and lower ends of brake shoes 27a,27b. When fitted on the support post members 33,33', the brake shoes are retained by a retainer ring 39 which is secured to the support posts 33,33' by screws 42,42' extending through apertures as indicated at 41,41' and which screws are threaded into corresponding tapped bores 43,43' of the support posts.

The brake shoes are resiliently biased apart by upper and lower pairs of springs 45,45' of a folded leaf spring configuration which fit within shallow recesses or indentations 47,47' of the support flanges 35,35' of the housing extensions 33,33'.

Figure 3:
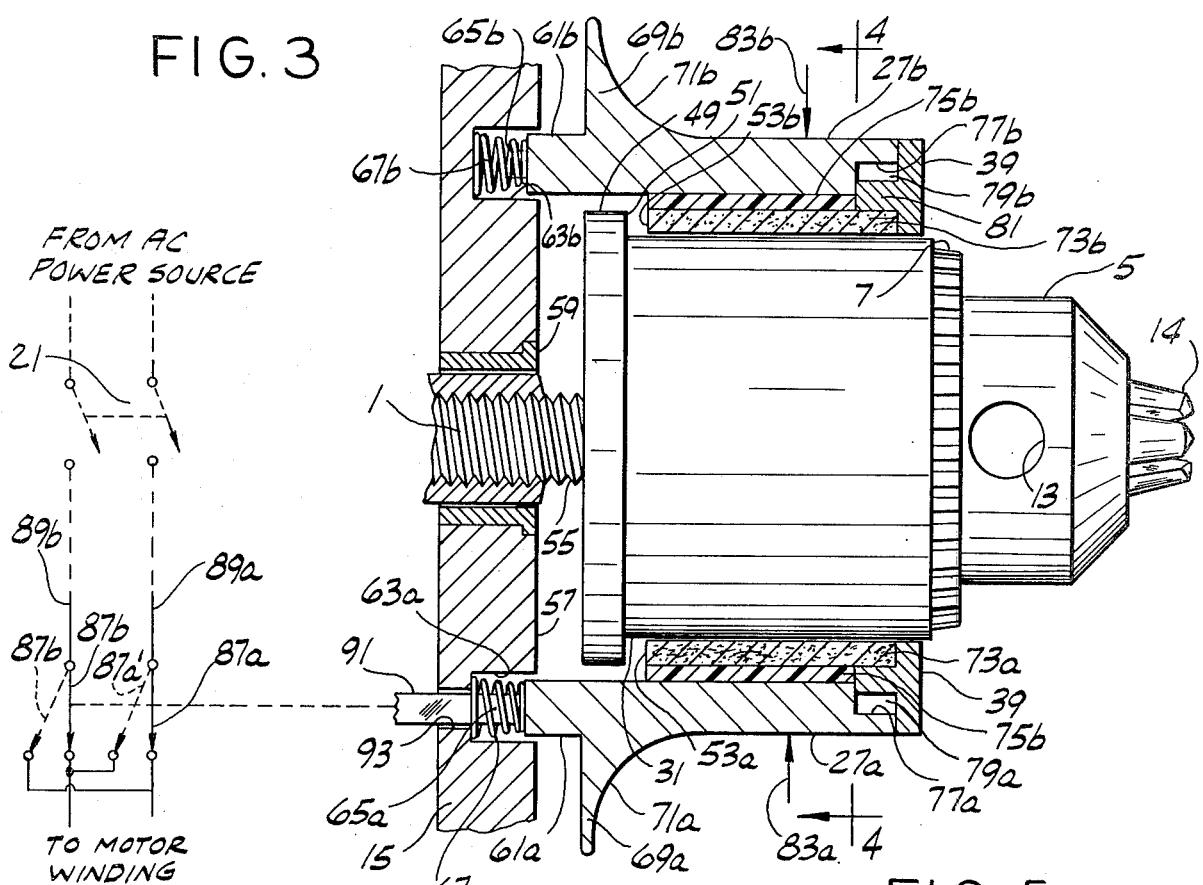
FIG. 3 is a horizontal cross-sectional view through the apparatus taken generally along line 3—3 of FIG. 1.

Referring now additionally to FIG. 3, it will be seen that chuck housing 7 is preferably of a modified configuration having an annular flange 49 at the rear thereof and such as provided for a distinct purpose, namely to provide a shoulder against which a corresponding frictional surface 53a,53b of the respective brake shoes is adapted to bear when the same are shifted rearwardly, i.e., toward the drill. Other than such modification, chuck 3 is entirely conventional in character, being threaded to a conventional motor spindle 55 which extends through a front surface 57 of motor housing 15 and journalled in conventional bearings as indicated representatively at 59.

Each of the brake shoes 27a,27b also includes a rearwardly projecting extension 61a,61b of rectangular configuration and fitting within a corresponding aperture 63a,63b of housing front wall 57. Each such extension includes a cylindrical rearwardly extending nipple 65a,65b around which is fitted a corresponding coil spring 67a,67b which bears against the bottom of its corresponding recess 63a,63b for resiliently biasing the brake shoes outwardly from housing 15 thereby to keep surfaces 53a,53b out of contact with chuck flange 49.

For purposes of permitting the user to reposition the brake shoes whereby they frictionally engage said flange 49 by being moved rearwardly toward drill 1, each of the brake shoes 27a,27b is provided with an outwardly extending flange or tab 69a,69b having a sloped or curved surface 71a,71b for providing a conformal surface for the fingers of the user whereby force rearwardly toward the drill is most conveniently applied.

Figure 4:
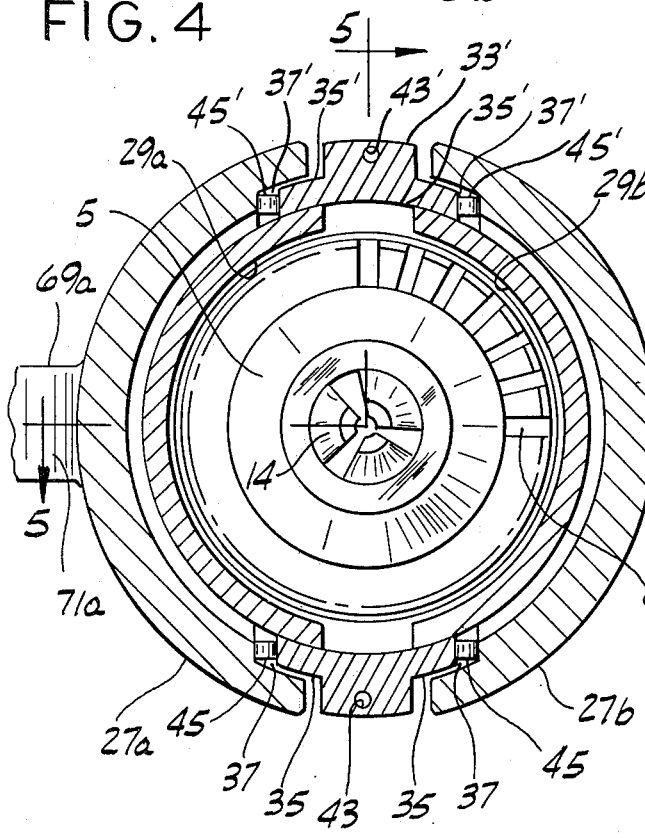
FIG. 4 is a transverse vertical cross-sectional view taken generally along line 4—4 of FIG. 3.
Figure 5:
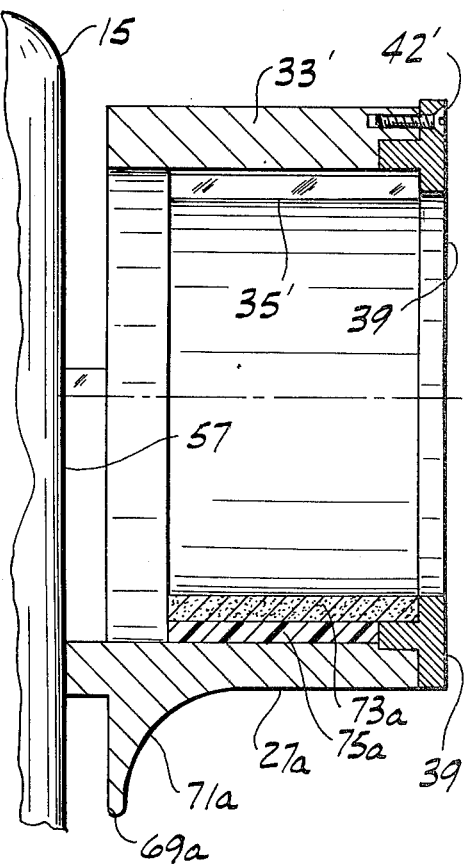
FIG. 5 is a vertical cross-sectional view taken generally along line 5—5 of FIG. 4 with a chuck of the drill tool having been removed.

FIG. 3 is also revealing as to the preferred construction of brake shoes 27a,27b. These may be constructed of various of different materials, such as of a die-cast metal, one of numerous alloys, or may be of a resinous synthetic material. In the drawings, however, the brake shoes are shown as having a metal outer layer to which an inner frictional layer 73a,73b is bonded by means of a layer 75a,75b of suitable adhesive, such as a polymer. The brake shoes are each provided with a respective L-shaped recess 77a,77b which, together with frictional layer 73a,73b, provide each shoe assembly with a U-shaped channel 79a,79b for receiving a narrow width collar 81 of retainer ring 39. As is apparent, the latter is T-shaped in cross-section, there being sufficient radial spacing between the side walls of the respective channel 75a,75b of the brake shoes for permitting each of the shoes 27a,27b to be moved from the position shown in FIG. 4 and thence radially inwardly, upon pinching action applied by the hand of the user. Such pinching provides diametrically opposed forces as indicated by arrows designated 83a,83b whereby the frictional layers 73a,73b are pressed inwardly to engage the peripheral surface 31 of chuck housing 7. Normally, the brake shoes are biased radially outwardly by the action of springs 45,45' which force the brake shoes 27a,27b away from support posts 33,33'.

Increased friction with the chuck housing is provided by engagement of the brake shoes with the peripheral flange 49 (with which the chuck housing is preferably provided for use with the invention) for the reason that, upon rearward movement of the brake shoes to the third position, it is desired that there by greater frictional force applied to the chuck housing by the brake shoes when it is desired to loosen the chucks, it being preferable to ensure that greater force for loosening will be provided by the apparatus than for tightening. However, one may utilize with the invention an unmodified chuck having no peripheral flange 49 whereupon one simply is required to exert increased pinching action (i.e., the diametrically applied forces as indicated by arrows 83a,83b in FIG. 3). In this way, the additional pinching force provides frictional retention by the brake shoes of the chuck housing sufficient to ensure that, when the drill tool is operated in the reverse direction, the drill chuck element 5 will be rotated relative to the chuck housing by operation of the drill releases the jaws 14 of the chuck from the drill or other shanked device held by the chuck. To obviate this requirement to apply additional force, the desired two-way action resulting from employment of the chuck housing modified to provide a flange for increasing the frictional area for the loosening mode is quite preferable.

It is apparent that access to the conventional apertures 13 provided conventionally for receiving a chuck key is in no way interfered with by the present invention. This permits, therefore, the use of a chuck key if it is desired to provide for even more increased tightening of the jaws 14 of the chuck about a drill shank where, for example, it is desired to drill through steel or other hard metals. Also, if the chuck had been overly tightened for one reason or another (as through initial use of the chuck key), one may then later use the chuck key for loosening the chuck at least to an initial degree whereby speedy further loosening may be accomplished by using the new chuck brake.

An important aspect of the chuck brake is that, under no circumstances, is the drill motor actually locked against rotation, since there never locking of the chuck by the frictional engagement of the brake shoes against the chuck housing. Therefore, full energization of the motor of the drill tool produces some slippage between the chuck housing and the brake shoes. Overheating and melting of the windings of the motor commutator is thus precluded. The motor, in other words, is always permitted to turn under full power to prevent internal damage from occurring.

As a preferred further modification of a drill tool of the invention, the same is provided with means, such as a switch represented in FIG. 1 at reference numeral 85, for automatically causing reverse rotation of the drill motor to be enabled upon depressing trigger switch 21. Switch 85 is of the double pole, double throw type, as exemplified in FIG. 3, having two sets of contacts 87a,87b which are interconnected with leads 89a,89b which normally supply power from the conventional on-off pushbutton switch 21 from an AC power source (such as 115-volt utility service) to a motor winding. As will be apparent, when switch contacts 87a,87b are moved from the position shown to their dotted line position, which is identified at 87a',87b', the connection between leads 89a,89b to the motor winding is effectively reversed.

To operate switch 85, which may be suitably located within the motor housing 1, there is provided an actuator rod 91 which extends through an aperture 93 in the gear housing front wall 57 for abutting nipple 65a of brake shoe 27a. Hence, the switch contacts are moved to position 87a',87b' upon movement of chuck brake shoe 27a from the position shown in FIG. 3 to its more rearward position, wherein it is caused not only to engage the peripheral surface 31 of the chuck housing and surface 51 of flange 49 but also is moved inwardly into recess 63a. It is to be understood that such movement does not cause energization of the motor winding, such being controlled only by the user upon operation of switch 21. Rather, when the brake shoes are grasped by the user and squeezed inwardly and thence moved inwardly toward gear housing 15, the connection of the motor leads from switch 21 is reversed whereby, upon closing of switch 21, the motor will be caused to operate in the reverse direction for causing reverse rotation of the chuck.

Figure 6:
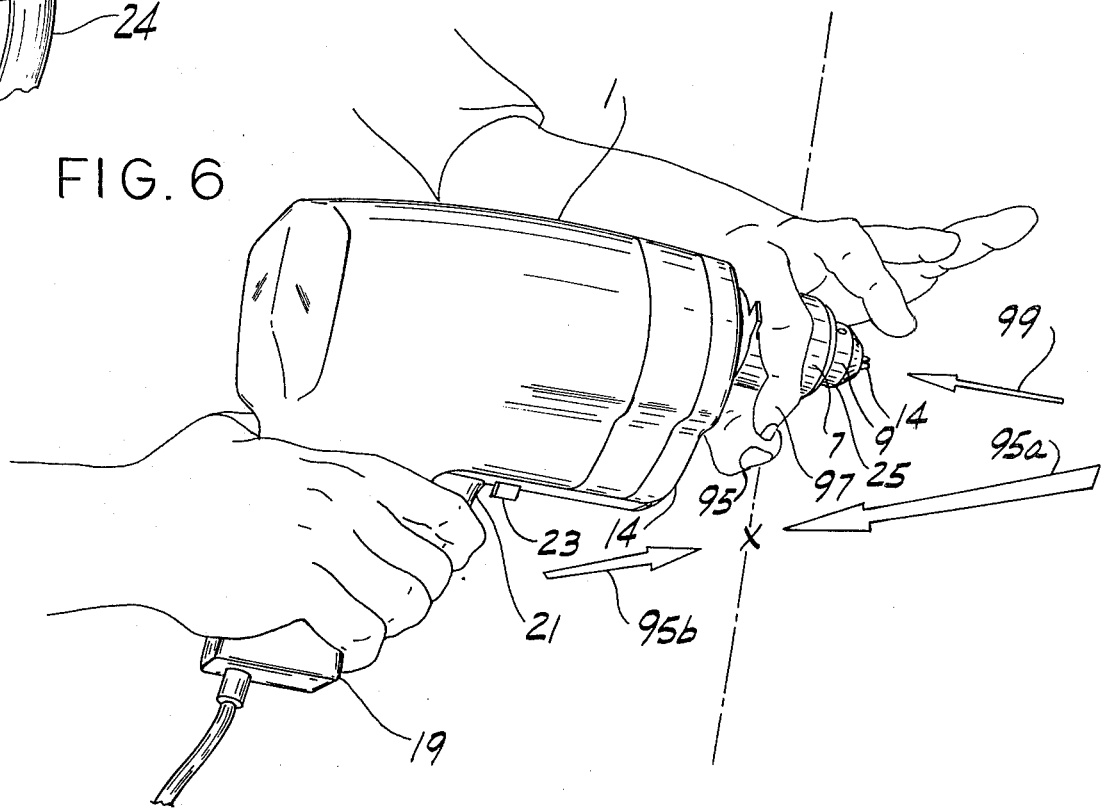
FIG. 6 is a perspective view of a drill tool and chuck brake of the invention illustrating the manner of usage of the chuck brake for selectively tightening or loosening a chuck of the drill tool.

FIG. 6 illustrates manual operation of the new chuck brake 25 by the user when the same is secured to the front housing 15 of the drill tool 1. Arrows as indicated at 95a,95b indicate the application of forces by the user to the brake shoes by pinching action of the thumb 95 and index finger 97 of the user, whereby the chuck jaws 14 are caused to clampingly engage the shank of a drill bit or other device. Similarly, if the user squeezes the brake shoes together and then also applies force toward housing 15, the brake shoes move rearwardly in the direction indicated by an arrow 99. In such position, the brake shoes not only provide increased frictional engagement of the surfaces of chuck housing 7 but also enable operation of the drill in the reverse direction without further action or concern on the user's part. In other words, when desired to loosen the chuck, without requiring the user to operate the reversing switch 23 or taking any other deliberate action, the mere squeezing and rearward movement of the chuck brake effectively programs the drill whereby, upon depressing trigger switch 21, the chuck is automatically loosened.

It is important to note that the handling position of FIG. 6 is physiologically "natural" when the user holds the drill at waist level in front of him. Thus, the invention advantageously utilizes the natural, direct opposition of the user's hands. More specifically, the user is able to make advantageous use of opposing forces resulting from the shoulder musculature in pressing the chuck brake 25 toward the drill housing 15. Yet, at the same time the user easily may exert pinching action upon the brake shoes 27a,27b by thumb and index finger opposition.

As will be observed from FIG. 3, springs 67a,67b resiliently bias the brake shoes outwardly toward retainer ring 39 whereby, in the absence of rearward forces applied by squeezing and by the pressure of the thumb and index finger bearing against the brake shoe tabs 69a,69b, the brake shoes are permitted to remain in the forward position limited by retainer ring 39. Hence, switch 85 normally does not effect operation of the drill and does not, under any circumstances, remain in the position causing reversed connection of the power leads to the motor winding unless user maintains rearward pressure against brake shoe tabs 69a,69b.

Accordingly, it will be seen that several objects of the invention are attained and various other advantages also result.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What I claim and desire to be secured by Letters Patent is:

1. Apparatus for use with a drill tool having a chuck including a chucking element and a housing relatively rotatable with respect to said chucking element for selective tightening or loosening of said chucking element about a tool shank, said apparatus comprising brake means adapted to surround and engage at least a portion of a peripheral surface of said chuck housing, means securing said brake means to said drill tool to permit selective movement of said brake means between a first position relative to said chuck housing freely permitting rotation of said chuck housing and a second position relative to said chuck housing providing friction between said brake means and said chuck housing for frictionally impeding rotation of said chuck housing whereby, upon movement of said brake means to said second position, operation of said drill tool provides selective tightening or loosening of said chucking element.

2. Apparatus for use with a drill tool having a chuck including a chucking element and a housing relatively rotatable with respect to said chucking element for selective tightening or loosening of said chucking element about a tool shank, said apparatus comprising brake means adapted to surround and engage at least a portion of a peripheral surface of said chuck housing, means securing said brake means to said drill tool to permit selective movement of said brake means between a first position relative to said chuck housing freely permitting rotation of said chuck housing and a second position relative to said chuck housing providing friction between said brake means and said chuck housing for frictionally impeding rotation of said chuck housing whereby, upon movement of said brake means to said second position, operation of said drill tool provides selective tightening or loosening of said chucking element, said brake means comprising at least one brake shoe having a frictional surface conformed to a peripheral surface of said chuck housing, and means for supporting said brake shoe adjacent said chuck housing.

3. Apparatus according to claim 2 and further comprising means resiliently biasing said brake shoe outwardly from said chuck housing.

4. Apparatus according to claim 2, said brake means comprising a pair of said brake shoes, each having said frictional surface, said shoes being on opposite sides of said chuck housing, said brake shoes being manually engageable by pinching action of the user for causing said frictional surfaces to bear against said chuck housing, said securing means comprising means attached to said drill tool for maintaining said shoes at the opposite sides of said chuck housing in radially movable relationship thereto.

5. Apparatus according to claim 4, said drill tool having a housing, said means attached to said drill tool comprising posts extending outwardly from said drill tool housing, said brake shoes interengaging said posts in movable relationship thereto, and resilient elements associated with at least one of said posts for resiliently biasing said brake shoes outwardly from said chuck housing for normally occupying said first position.

6. Apparatus according to claim 5 comprising a retention member at least partially surrounding said chuck and carried by said posts for retaining said brake shoes.

7. Apparatus according to claim 6, said brake being slidable relative to said posts for movement away from said retention member and toward said housing, said chuck housing having a first surface area adapted to be frictionally engaged by said brake shoes upon said pinching action, and having a further surface area adapted to be frictionally engaged by said brake shoes upon movement toward said drill tool housing driving said pinching action.

8. Apparatus according to claim 7, said chuck housing having a flange proximate said drill tool housing, said flange constituting at least in part said further surface area, said flange being frictionally engageable by said brake shoes upon said movement thereof toward said drill tool housing.

9. Apparatus according to claim 8 and further comprising means for resiliently biasing said brake shoes toward said tention member, the latter constituting an annular element secured to each of said posts.

10. Apparatus according to claim 7 and further comprising switch means adapted for being actuated upon selective movement of said brake shoes toward said drill tool housing, said switch means when actuated causing operation of said drill tool for reverse rotation of said chuck to be enabled, said drill being of the electrically energized, reversible type.

11. Apparatus according to claim 10, said switch means comprising a switch interconnected within said drill housing with an electric motor for driving said chuck, and means extending from at least one of said brake shoes through a face of said drill housing for actuating said switch.

12. Apparatus for use with a hand-held, reversibly rotatable drill tool of the variable speed type having a chuck including a chucking element and a housing relatively rotatable with respect to chucking element for selective tightening or loosening of said chucking element, said apparatus comprising brake means adapted to surround and engage at least a portion of a peripheral surface of said chuck housing, means securing said brake means to said drill tool to permit selective manually-effected relative movement of said brake means between first, second, and third positions relative to said chuck housing, said first position freely permitting rotation of said chuck housing relative to said brake means, said second position providing friction between said brake means and a predetermined area of the peripheral surface of said chuck housing for frictionally impeding the rotation of said chuck housing in a first direction, said third position providing friction between said brake means and a predetermined increased area of the peripheral surface of said chuck housing for frictionally impeding the rotation of said chuck housing in the opposite direction, and means responsive to movement of said brake means to said third position for causing operation of said drill tool to be enabled for reverse rotation of said chuck whereby, upon movement of said brake means to said second position, operation of said drill tool provides selective tightening of said chucking element and, upon movement of said brake means to said third position, provides selective loosening of said chucking element.

* * * * *